United States Patent [19]
Brantley et al.

[11] Patent Number: 5,980,382
[45] Date of Patent: Nov. 9, 1999

[54] SELF-PROPELLED PEANUT COMBINE

[75] Inventors: Stanley A. Brantley; Mearl J. Jennings; K. Michael Williams; Shawn T. Lane; Michael R. Sayre; David E. Stables, all of Suffolk, Va.

[73] Assignee: Amadas Industries, Suffolk, Va.

[21] Appl. No.: 09/213,386

[22] Filed: Dec. 10, 1998

Related U.S. Application Data

[63] Continuation of application No. 08/733,184, Oct. 17, 1996, abandoned
[60] Provisional application No. 60/005,661, Oct. 17, 1995.

[51] Int. Cl.[6] .................................................. A01F 12/00
[52] U.S. Cl. ............................ 460/16; 460/126; 460/141; 56/14.6; 171/26; 171/27; 171/DIG. 1
[58] Field of Search .................................. 460/126, 141, 460/142, 149, 150, 16; 56/14.5, 327.1; 171/DIG. 1, 26, 27, 1

[56] References Cited

U.S. PATENT DOCUMENTS

| | | | |
|---|---|---|---|
| 4,531,528 | 7/1985 | Peters et al. | 130/24 |
| 4,607,703 | 8/1986 | Wang | 171/1 |
| 4,640,085 | 2/1987 | Rupprecht | 56/14.6 |
| 4,696,151 | 9/1987 | Hobbs | 56/14.6 |
| 4,770,190 | 9/1988 | Barnett | 130/27 |
| 4,802,496 | 2/1989 | Bennett | 130/27 S |
| 4,838,101 | 6/1989 | Dobberpuhl et al. | 74/15.63 |
| 4,843,803 | 7/1989 | Teijido et al. | 56/14.6 |
| 4,866,920 | 9/1989 | Kerckhove et al. | 56/16.6 |
| 4,906,262 | 3/1990 | Nelson et al. | 55/290 |
| 5,136,507 | 8/1992 | Shiraishi et al. | 364/424.05 |
| 5,138,826 | 8/1992 | Hobbs | 56/14.6 |
| 5,205,114 | 4/1993 | Hobbs | 56/14.6 |

*Primary Examiner*—Thomas B. Will
*Assistant Examiner*—Arpad Fabian Kovacs
*Attorney, Agent, or Firm*—Burns, Doane, Swecker & Mathis

[57] ABSTRACT

A crop harvesting combine having a body with a feeder house at its front end. The feeder house carries a detachable header which may be wider than the body and can thus be detached when moving the combine. The feeder house is vertically moveable in an arcuate path from a header ground contacting position to an elevated position. A first thrashing cylinder is in the header and a second thrashing cylinder is at the front of the combine body. The arcuate path of the feeder house has its center approximately at the rotational axis of the second thrashing cylinder so the distance between the axes of the first and second cylinders remains approximately constant as the feeder house is moved vertically. Downstream of the thrashing cylinder are a plurality of separation cylinders, at least some of which have concaves thereunder for reorienting elongate trash before being discharged.

13 Claims, 3 Drawing Sheets

SELF-PROPELLED PEANUT COMBINE

This application is a continuation of application Ser. No. 08/733,184, filed Oct. 17, 1996, now abandoned, which claims the benefit of U.S. Provisional Application No. 60/005,661, Filed Oct. 17, 1995.

BACKGROUND OF THE INVENTION

This invention relates to a peanut combine of the general type disclosed in U.S. Pat. No. 4,696,151 (the '151 patent), U.S. Pat. No. 5,205,114 (the '114 patent), U.S. Pat. No. 4,136,507 (the '507 patent) and U.S. Pat. No. 5,138,826 (the '826 patent); the disclosures of each of these prior art patents is hereby incorporated by reference and they may be referred to herein by the shorthand number indicated above.

Each of the foregoing patents discloses a peanut combine which is designed to be towed behind a tractor. There are inherent disadvantages in towing such a machine because the driver needs to look ahead to be careful that he is in alignment with the windrows of peanut vines, but also needs to look behind to check on the operation of the combine, the power take-off connection thereto and the condition of the windrow after the machine passes thereover.

It is known in the prior art to utilize self-propelled combines for the harvesting and threshing of grain, for example U.S. Pat. No. 4,531,528; 4,770,190; 4,802,496; 4,838,101; 4,843,803; 4,866,920 and 4,906,262, the disclosures of each of these prior art patents is hereby incorporated by reference.

SUMMARY OF THE INVENTION

It is an object of the present invention to provide a self-propelled peanut combine which has a header for picking up peanut laden vines from the ground, passing the vines through a feeder house at the front of the body of a combine and subsequently through a series of thrashing cylinders (which are sometimes referred to as "picking cylinders") and then to a series of separating cylinders which will separate the peanuts from the vines, pneumatically convey the peanuts to an elevated storage bin on the combine, and discharge the vine fragments from the rear of the combine body.

It is a further object of the present invention to provide a self-propelled peanut combine where the support wheels are located rearwardly of the pick-up cylinder so that the wheels do not run over the peanut laden vines on the ground and wherein the operator's cab is located high up and forwardly so the operator will have a clear view of the vines being fed into the combine header.

BRIEF DESCRIPTION OF THE DRAWINGS

Other objects and advantages will become clear from the following description and drawings wherein the invention is illustrated by way of example and not of limitation and in which.

DETAILED DESCRIPTION OF THE PREFERRED EMBODIMENT

In the present invention, the operator is housed in a high level cab 14 where he has a panoramic window 16 with a full view of picking head or header 50 and the crop windrows he is approaching. The combine wheels 10 and 12 are behind the header so that the crop is out of the way before the wheels can contact it.

Figure 1:
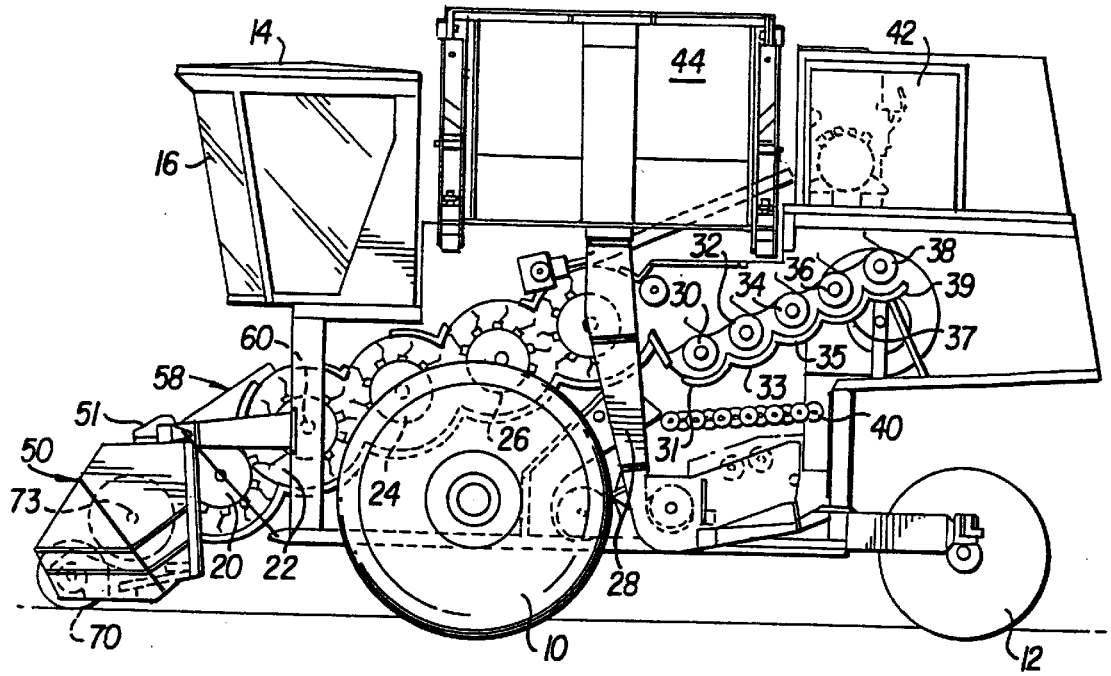
FIG. 1 is a left side elevational view of the self-propelled peanut combine of the present invention partially in section and partially broken away to show the interior of the combine.
Figure 4:
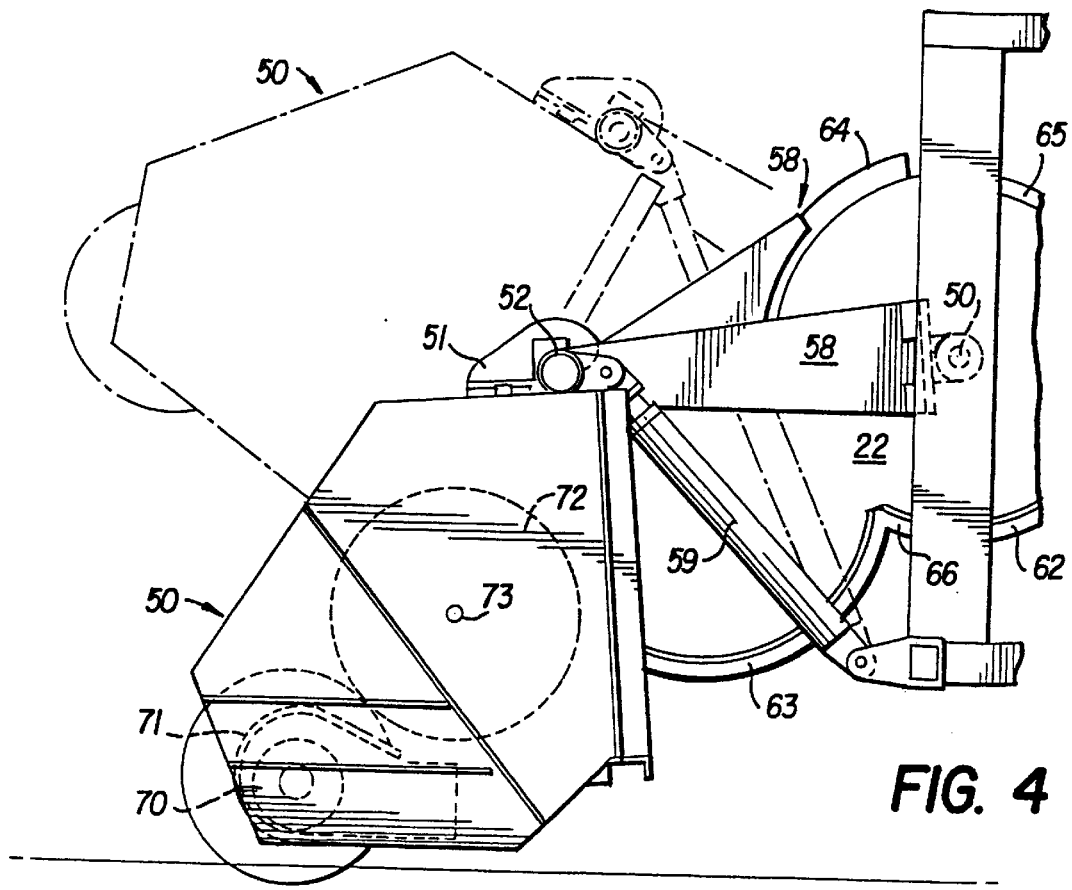
FIG. 4 is an enlarged portion of the side view shown in FIG. 1.

The picking head or header 50 is removably attached to the combine feeder house 58 by attachment means in the form of two hooks 51 (see FIGS. 1 and 2) which latch over a support pipe 52 which serves as a receiving means for the hooks 51. This pipe 52 is secured to the feeder house 58 radially to the center of the second picking cylinder 60, and arcuately moveable by a pair of hydraulic cylinders 59. The feeder house 58 being pivoted about the shaft center 60 allows the header 50 attached to the feeder house 58 to maintain a constant distance from the shaft center 60 while moving arcuately to achieve a critical picking height from the ground. This action of pivoting the entire feeder house 58 and header 50 about the second picking cylinder 22 is possible because the tips 53 of the thrashing cylinders fingers 54 (see FIG. 2) travel in a circular path so that in any position, the thrashing operation between the thrashing cylinders 20, 22 is constant because the amount of inter-digitation between the fingers of cylinder 20 and cylinder 22 remains substantially the same.

Figure 6:
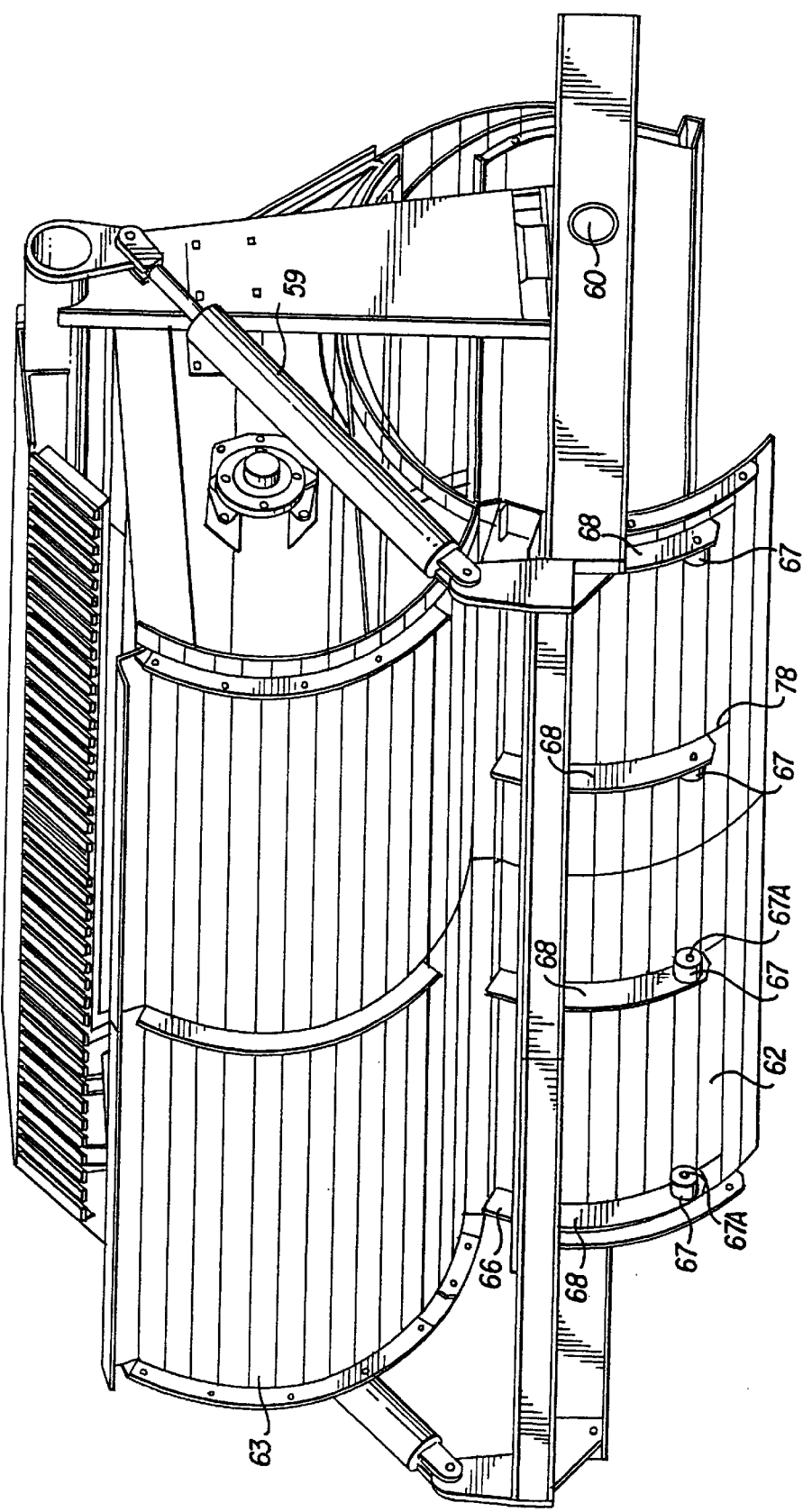
FIG. 6 is a perspective view looking upward from under the combine to show the concaves of the second picking cylinder.

The feeder house 58 is pivoted about the center 60 of the second thrashing cylinder 22. The second thrashing cylinder 22 has concaves 64, 65 above the cylinder and these concaves have a center of curvature located at the center 60. The thrashing concave 65 is stationary and fixed to the combine. The thrashing concave 64 is fixed to the feeder house 58 and moves arcuately about the shaft center 60. These two concaves 64, 65 have a sufficient arcuate length and overlap so that together they will always cover the overhead of the thrashing cylinder 22 regardless of the position of the feeder house 58. The same can be said for the concaves underneath, as they will always cover the bottom of the second thrashing cylinder 22. The concaves are supported by flanges 68 attached to the concave 66 (see FIG. 6). The flanges 68 protrude through slots 78. Rollers 67 are attached to flanges 68 by means of bolts 67A. These rollers 67 are necessary to hold the concaves 62, 66 in close proximity to each other in case of material build-up or to overcome any possible variations in the manufacture of said concaves.

The present self-propelled combine may be used with picking heads of different widths, e.g., 6 row or 8 row. A combine with an 8 row head is too wide to be moved on a highway; consequently it is desirable that a wide picking head 50 be completely dismountable by lowering the support pipe 52 to the point where the header 50 rests on the ground, then disconnecting its wiring harness and hydraulic lines and then continuing to lower pipe 52 until it is free of hooks 51 and then backing the combine away from picking head 50. A similar operation can be used to place header 50 on the back of a truck for highway transportation. In other words, the elevatable support pipe 52 can act as a front end loader for picking up and lowering the picking head or header 50.

Figure 2:
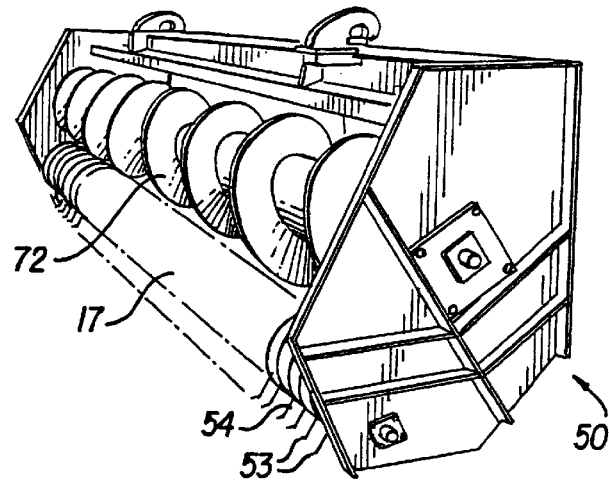
FIG. 2 is a perspective view of the header of the present invention showing the front thereof.
Figure 3:
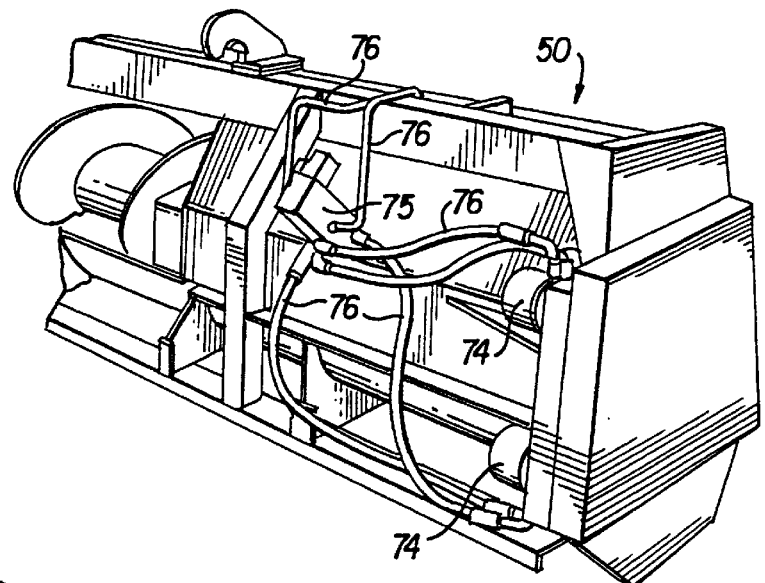
FIG. 3 is a rear perspective view of the header shown in FIG. 2.
Figure 5:
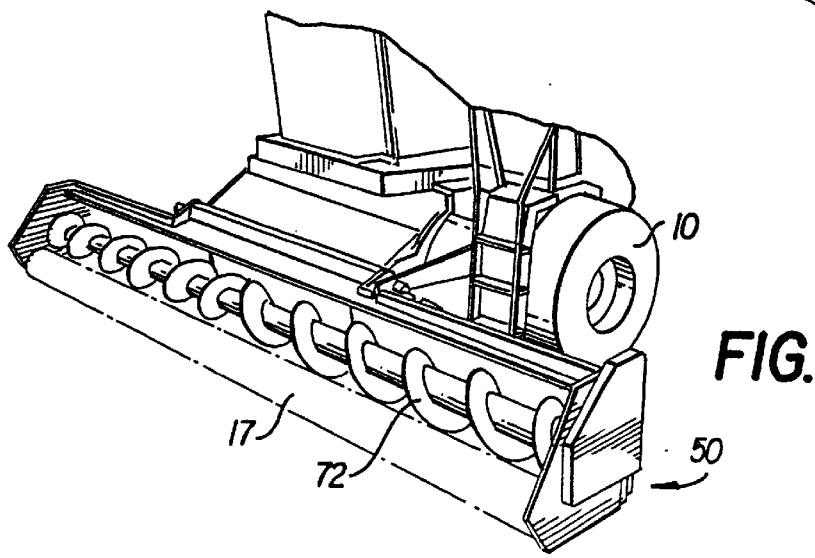
FIG. 5 is a perspective view similar to FIG. 2 but also showing the auger in greater detail and the pick-up cylinder schematically.

The header 50 is shown in FIGS. 2 and 5 (front view) and FIG. 3 (rear view). The header 50 is comprised of four major elements. The first major element which lifts the vine material and peanuts from the ground is the pick-up 17. The pick-up 17 is a cylinder having spring fingers 54 projecting therefrom (see FIG. 2). Pick-up 17 rotates in a motion with a non-linear velocity caused by an eccentric cam-plate 70. The pick-up 17 cylinder is protected by bands 71 which guide the vines from the pick-up cylinder to the auger 72. The auger 72 is the second major component in the header. The auger 72 rotates about a shaft center 73. The auger is bi-directional to allow material to flow from either end of the pick-up 50 to the center of the first thrashing cylinder 20. These two components, the auger 72 and the pick-up 17 are controlled by the third and fourth major components, the hydraulic drive motors 74 and the directional control valve 75 (see FIG. 3). The hydraulic fluid flow to drive the motors 76 is derived from the engine compartment 42 and carried to the directional control valve 75 by hydraulic lines on the combine coupled to the hydraulic lines 76 on the header 50. The hydraulic valve 75 provides flow to the hydraulic drive motors 74 and can be actuated by a remote control locate in the cab 14. This actuation will cause the pick-up 17 to stop and the auger 72 to reverse. Therefore, if the operator sees that auger 72 is beginning to stall due to an excessive amount of vine material being processed at any particular time, the remote control can be used to actuate the directional control valve 75 which will control the fluid flow to the hydraulic drive motors 74 to reverse the auger 72 and clear the blockage.

This combine has a series of picking or thrashing cylinders 22–28 which convey the peanut vines upwardly and backwardly to a series of separation cylinders 30–38. Under these separation cylinders, instead of a planar surface as in the '826 patent, there is a series of concaves 31–39 which act to reorient elongated sticks or trash so that they will lie cross-wise rather than end wise when they could fall into separator disks 40 and cause the sticks to be dropped into the harvested peanuts.

At the upper portion of the combine, behind the cab is a harvested peanut storage bin 44 and to the rear thereof is engine room 42. There is direct mechanical drive from the engine to the thrashing cylinders and to the separation cylinders plus hydraulic drive to power other aspects of the machine. The rear wheels are powered by hydraulic motors and are steerable for short cornering.

An additional advantage of the present invention, which apparently has little to do with the machine being self-propelled, is the much higher throughput in the machine as compared with the prior art pull-type machines. The machine of the previously mentioned patent '826 which is known to applicants, has only four thrashing cylinders which are virtually the same as cylinders 20, 22, 24 and 26 of the present invention except they are about 6% narrower. However, the addition of the fifth thrashing cylinder 28 has surprisingly led to a 30% increase in the throughput, much higher than would be expected. The apparent reason is the increased ability of the machine to spread the vines more evenly before they enter the separator section, consequently making the separation more efficient.

We claim:

1. A self propelled peanut combine for picking peanut laden vines from the ground and thrashing the peanuts from the vines comprising a combine body having first and second spaced apart sidewalls defining a flow path through said body from a front end thereof to a rear end thereof;

said body having an upper wall above said flow path and a lower wall below said flow path;

a feeder house and a header at the front of said feeder house, said header carrying a pickup cylinder for picking up peanut laden vines from the ground and said feeder house carrying a first thrashing cylinder rotatable about a first axis;

a plurality of thrashing cylinders in said body spaced along said flow path from an upstream to a downstream position for thrashing peanuts from vines, the upstream cylinder having a second axis of rotation:

means for moving said feeder house in an arcuate path between a header ground contacting position and an elevated position through an arcuate path having its center approximately at said second axis of rotation;

a pair of ground contacting front support wheels mounted from said body to extend below said lower wall, said front support wheels rotating about a front axis which is positioned rearward of said header so that said header will contact said vines prior to contact by said front wheels;

an operator's cab positioned above said upper wall and forwardly of said front wheels so as to give an operator a clear view of the vines as they enter said header.

2. The combine of claim 1 including an engine compartment mounted above said upper wall and rearwardly of said operator's cab.

3. The combine of claim 2 including a storage bin for harvested peanuts and positioned rearwardly of said front wheels, above said upper wall and between said operator's cab and said engine compartment.

4. The combine of claim 3 in which said header has an auger for collecting vines from said pickup cylinder and transferring said vines to a first thrashing cylinder.

5. A self propelled peanut combine for picking up peanut laden vines from the ground and thrashing the peanuts from the vines comprising a combine body having first and second spaced apart sidewalls defining a flow path through said body from a front end thereof to a rear end thereof;

a plurality of thrashing and separating cylinders spaced along said flow path for separating peanuts from said vines;

a feeder house at the front of said body having a first thrashing cylinder mounted therein for rotation about a first axis of rotation, said feeder house being mounted for movement in an arcuate generally vertical path in relation to said body;

a header for picking peanut laden vines from the ground;

means on said feeder house for mounting said header thereon;

a second thrashing cylinder at the front of said body and rotatable about a second axis of rotation;

means for moving said feeder house and said header in said arcuate path from a header ground contacting position to an elevated position with said second axis of rotation being the approximate center for said arcuate path.

6. The combine of claim 5 in which said second thrashing cylinder has a plurality of projecting fingers which move in a circular rotary path about said second axis of rotation and said first thrashing cylinder has a plurality of projecting fingers which move in a circular path of rotation and interdigitate with the fingers of said second thrashing cylinder, the arrangement being such that the interdigitation remains substantially constant as the feeder house is elevated or lowered by said moving means.

7. The combine of claim 5 in which said header has a pickup cylinder and an auger each mounted for rotation about an axis of rotation which is generally parallel to said first axis of rotation, means for rotating said pick up cylinder; means for rotating said auger; said header having means for reversing the rotation of said auger while stopping rotation of said pickup cylinder in case of a jam.

8. The combine of claim 5 in which said means for moving said feeder house and said header comprises a pair of arms and a fluid actuated cylinder means for moving said arms in a generally vertical path.

9. The peanut combine of claim 5, in which each arm has a free end with an attachment means and the header has receiving means for engagement by said attachment means.

10. The combine of claim 9 in which said attachment means is a downward facing "U" shaped hook.

11. A self propelled peanut combine for picking up peanut laden vines from the ground and thrashing the peanuts from the vines comprising a combine body having first and second spaced apart sidewalls defining a flow path through said body from a front end thereof to a rear end thereof;

a plurality of thrashing cylinders spaced along said flow path for thrashing peanuts from vines;

a plurality of separation cylinders in said body downstream of said thrashing cylinders, at least some of said separation cylinders having a concave thereunder for reorienting sticks and elongate trash to lie generally cross-wise rather than end-wise;

a feeder house at the front of said body for mounting a header for picking peanut laden vines from the ground, said feeder house including a first thrashing cylinder rotatable about a first axis of rotation; and fluid actuated cylinder means having a pair of arms for moving said feeder house and said header in an arcuate path so that said header moves from a ground contacting position to an elevated position;

a second thrashing cylinder at the front of said body and having a second axis of rotation; said second axis of rotation being the center for said arcuate path for movement of said arms;

said header being detachable from said feeder house so that when said header is resting on a support, the arms can be lowered to readily disengage from said header.

12. The combine of claim 11 in which said second thrashing cylinder has a plurality of projecting fingers which move in a circular rotary path about said second axis of rotation and said first thrashing cylinder has a plurality of projecting fingers which move in a path of rotation and interdigitate with the fingers of said second thrashing cylinder, the arrangement being such that the interdigitation remains substantially constant as the header is elevated or lowered by said moving means.

13. The combine of claim 11 in which said plurality of thrashing cylinders if five cylinders.

\* \* \* \* \*